United States Patent
Klingbeil et al.

(10) Patent No.: US 8,016,963 B2
(45) Date of Patent: Sep. 13, 2011

(54) PRECISION LAMINATION OF MULTILAYERED STRUCTURES

(75) Inventors: Kevin Klingbeil, Osceola, WI (US); Jim Goosen, Baldwin, WI (US); Tom Daul, New Richmond, WI (US); William Dinauer, Hudson, WI (US)

(73) Assignee: Lasx Industries, Inc., White Bear Lake, MN (US)

( * ) Notice: Subject to any disclaimer, the term of this patent is extended or adjusted under 35 U.S.C. 154(b) by 139 days.

(21) Appl. No.: 12/344,791

(22) Filed: Dec. 29, 2008

(65) Prior Publication Data

US 2009/0173428 A1 Jul. 9, 2009

Related U.S. Application Data

(60) Provisional application No. 61/016,913, filed on Dec. 27, 2007.

(51) Int. Cl.
*B32B 41/00* (2006.01)

(52) U.S. Cl. .......... 156/64; 156/361; 156/366; 156/367; 156/368; 156/378

(58) Field of Classification Search ............ 156/64, 156/361, 366, 367, 368, 378
See application file for complete search history.

(56) References Cited

U.S. PATENT DOCUMENTS

| | | | |
|---|---|---|---|
| 6,277,230 B1 * | 8/2001 | Milko | 156/230 |
| 6,827,906 B1 * | 12/2004 | Bjornson et al. | 422/101 |
| 2003/0136495 A1 * | 7/2003 | Miller et al. | 156/64 |
| 2006/0213609 A1 * | 9/2006 | Green et al. | 156/265 |

* cited by examiner

*Primary Examiner* — George R Koch, III
(74) *Attorney, Agent, or Firm* — Law Office of Scott C. Harris, Inc.

(57) ABSTRACT

This document describes the methodology for laminating layers of converted materials to form a precision laminated multilayered structure. With this methodology the pattern in the next layer to be laminated to create the multilayered structure can be adjusted based upon first or prior layer that the next layer is to be laminated to. The next layer will then be precisely aligned to the first or prior layers creating a precision laminated multilayer structure.

14 Claims, 4 Drawing Sheets

PRECISION LAMINATION OF MULTILAYERED STRUCTURES

This application claims priority from provisional application No. 61/016,913, filed Dec. 27, 2007.

BACKGROUND

Precision laminating of multilayered structures is simple if the patterns required in each layer have similar features that allow for laminating the materials prior to converting. Only certain multilayered structures can be conveniently made in this way. As the market demands smaller and more complex multilayered structures, this becomes more difficult. The manufacture of complex multilayered structures is limited currently by the necessity of forming subassemblies or individual components and then laminating these subassemblies or individual components together without the subassemblies or individual components precisely referenced to each other. This is very time consuming and inaccurate.

SUMMARY

The present application discloses a laminating system which uses a camera system to determine locations of patterns on one continuous web of material. It also operates to automatically form mating patterns on another web of material, while both webs of material are laminated together.

BRIEF DESCRIPTION OF THE DRAWINGS

In the Drawings:

FIG. 4 shows a pattern processed in a first layer, FIG. 5 shows a pattern processed in a second layer, and FIG. 6 shows the finished multilayered structure formed from laminating the first layer to the second layer.

DETAILED DESCRIPTION

A first embodiment describes a camera system that is used to adjust the pattern being currently processed on a second layer within a multilayered structure based upon a previously converted pattern. The processing on the second layer is carried out prior to the first and second layers being laminated together.

Roll to roll converting and lamination is being shown. However, in other embodiments, this can be done with sheet or individual components.

Figure 1:
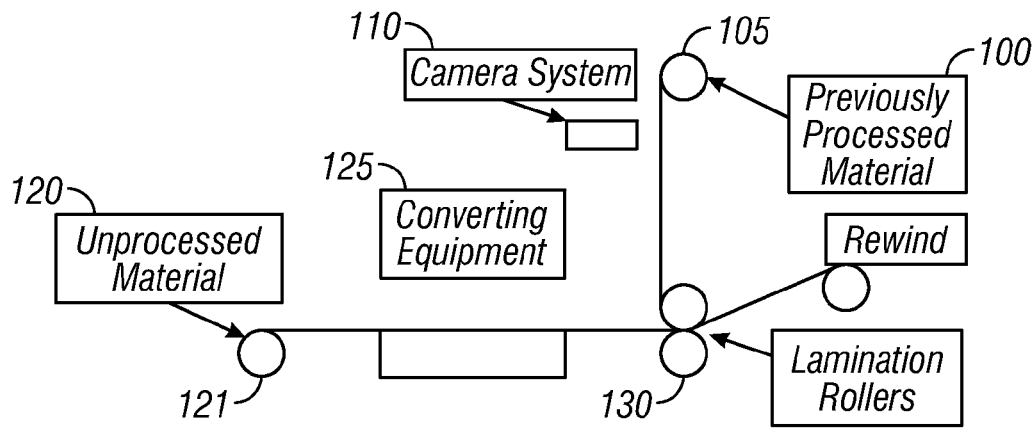
FIG. 1 shows a diagram of the machine.

An embodiment is shown in FIG. 1. A previously converted web of material on roll 100 is unwound around idler roller 105, while a camera system 110 images that material. The roll is unwound while processing another roll 120 of unprocessed material.

The camera system 110 includes a camera and a processor that measures a feature of the previously converted roll 100 and accordingly adjusts the pattern of the roll being converted 120 using converting equipment 125. The two materials are then fed by first roller 121 and laminated together by lamination rollers 130. Because the pattern of the roll currently being converted 120 has been adjusted based upon the pattern of the roll previously converted 100, the pattern in each material will be aligned with each other. This allows for precision lamination of the pattern in the two rolls of converted material.

Figure 2A:
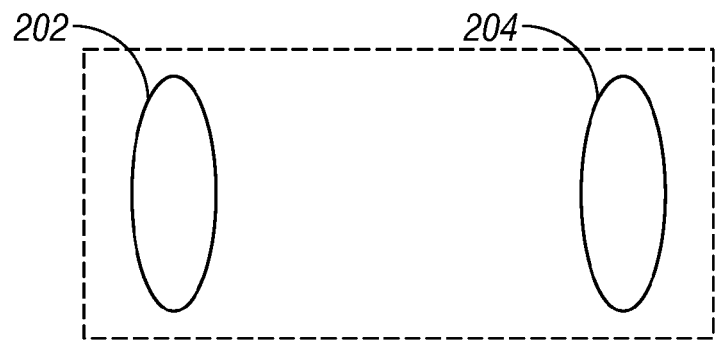
FIGS. 2A and 2B show exemplary features that can be formed and how those features are in registration with one another.
Figure 2B:
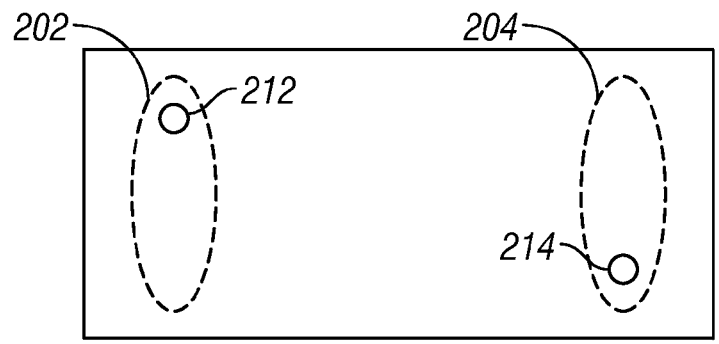

A complex two-layered structure can be formed according to an embodiment described with reference to FIGS. 2A and 2B. The first layer of a multilayered structure may have microfluidic oval-shaped channels 202, 204 as shown in FIG. 2A. Each of the layers in the embodiment may be a web of material that is unrolled from a roll. The final outer periphery of the web surrounds the oval-shaped channels.

The next layer may only have vent holes 212, 214 located within the first layer's channels. This may allow for the two layers to be laminated together prior to converting the second layer.

The camera system acts as a measurement system to locate the channels previously processed in the first layer. The vent holes 212, 214 in the second layer can be precisely placed and processed with respect to the channel's in the first layer. FIG. 2B illustrates the laminated multilayered structure.

Figure 3A:
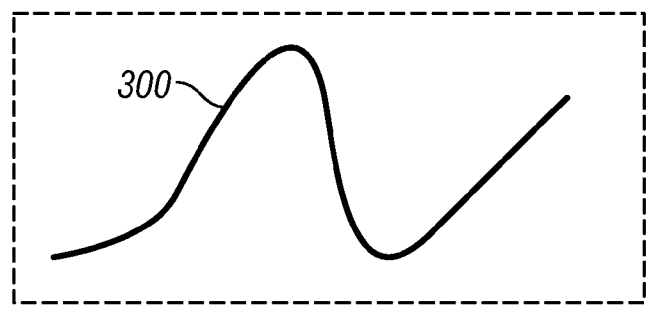
FIGS. 3A-3C show features that are formed using this system where there is a rotated part.
Figure 3B:
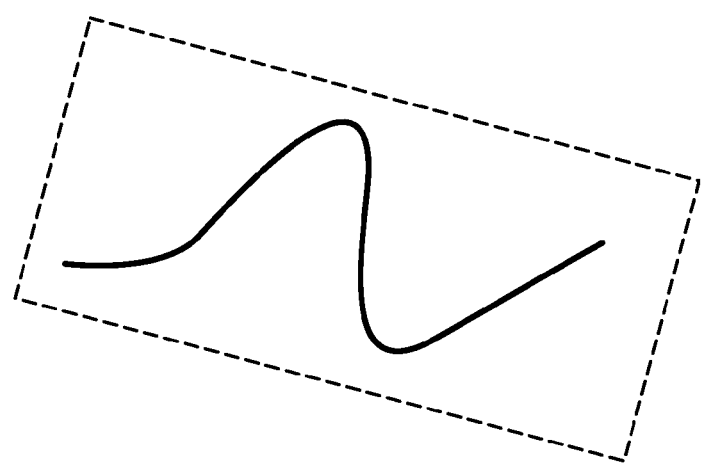
Figure 3C:
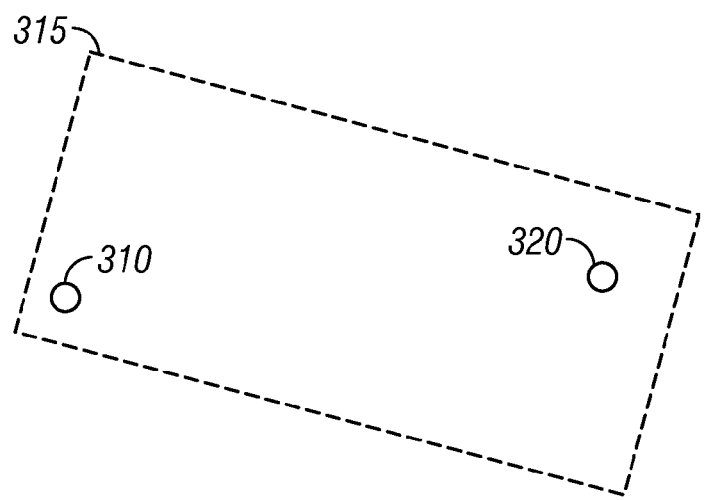

FIGS. 3A-3C illustrate another embodiment of a multilayered structure of a microfluidic channel 300 formed from two webs of material, each web of material forming a layer.

If the two layers are laminated together prior to processing, the microfluidic channels 300 in the first layer may get damaged when creating the inlet and outlet ports (310, 320) in the second layer 315. Also, there may be offsets between the layers; FIG. 3B shows how one of the layers may be tilted or rotated relative to the other layer.

Here, the second layer 315 is processed prior to being laminated to the first layer. When creating multilayered structures this way, the tolerances from both the converting process and the laminating process of the converted materials is used as parameters. The embodiment adjusts the pattern for the second layer 315 to match the pattern 300 from the first layer without the layers needing to be laminated together. The camera system 110 captures the position, size, rotation, etc. of the first pattern 300 while that first pattern passes idler roller 105 and prior to lamination rollers 130. The camera system 110 adjusts the second pattern processed by converting equipment 125 to match the first pattern when both layers are subsequently laminated by lamination rollers 130.

The actual pattern may be rotated as shown in FIG. 3B. The camera system 110 captures that the first pattern is rotated slightly and adjusts the second pattern 310, 320, which includes the inlet and outlet ports, so that when the two layers are laminated a precision laminated multilayered structure is created.

Figure 4:
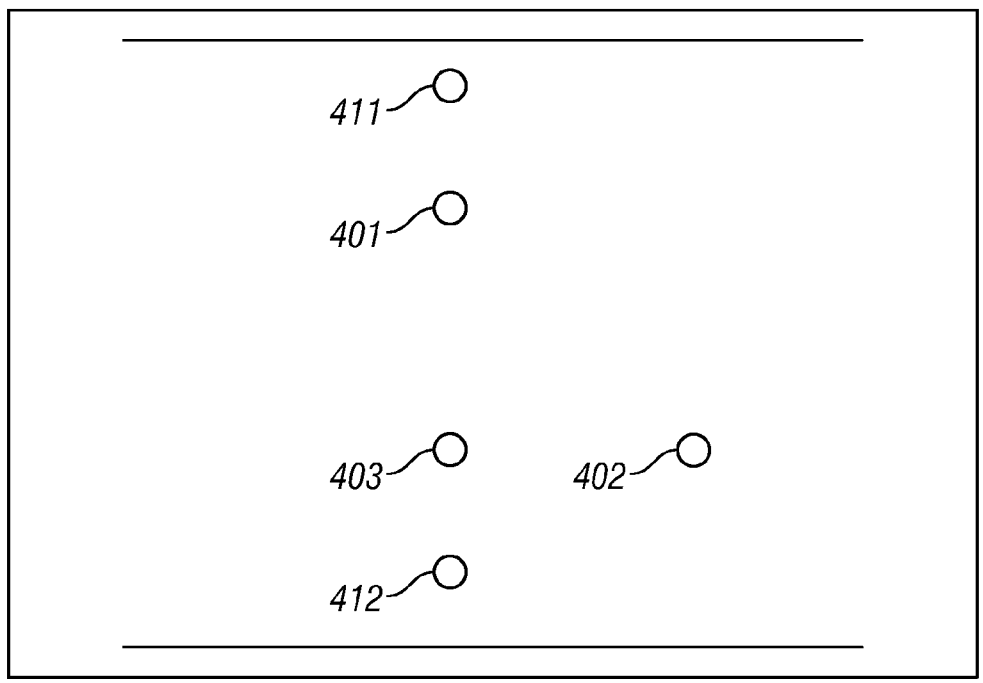
FIGS. 4-6 show a roll-to-roll technique where

Another embodiment is shown in FIG. 4. An initial roll is first processed with three small circles 401, 402, 403 processed into the middle of the web and registration marks 411, 412 on each side of the web that are used for registration of the initial pattern during the precision lamination process.

After the initial pattern 401, 402, 403 is processed, the camera system 110 uses registration marks 411, 412 to locate the initial pattern in material 100.

Figure 5:
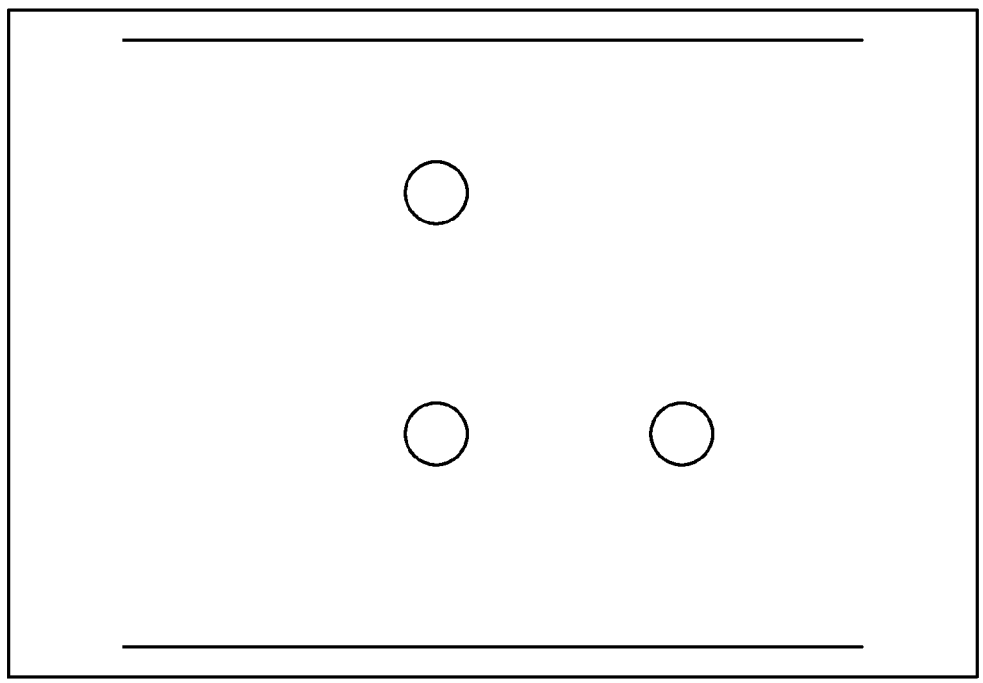

The pattern of three large circles for the unprocessed material 120 is shown in FIG. 5. The material 120 is processed according to this pattern once the camera system 110 uses the location of the initial pattern to calculate where converting equipment 125 processes the pattern shown in FIG. 5 into material 120. The two materials 100 and 120 are then laminated together by lamination rollers 130 immediately following processing of material 120.

Figure 6:
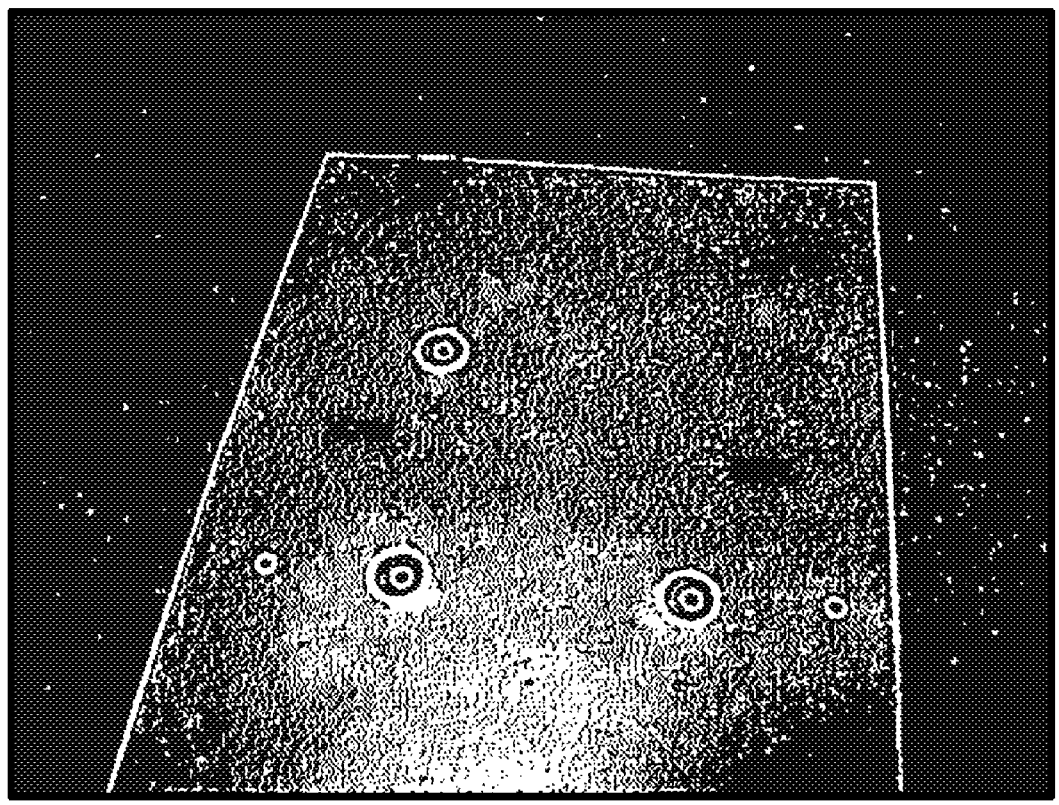

The two materials 100 and 120 are laminated together such that the small circles in material 100 are precisely located in the larger circles in material 120. This is shown in FIG. 6.

According to a test, a first pattern processed into the initial web was purposely moved around to verify during the precision lamination process that the process pattern on the second web would follow and align to the first pattern. Results of testing showed a standard deviation of approximately 0.0025" in the location of the second pattern with reference to the first pattern.

According to the present system, a precision laminated multilayered structure can be created using roll-to-roll or other production means that will allow for mass production of precision multilayered structures in less time than the laminating of multiple individual components that is currently being done.

Another improvement is in the alignment of the pattern in each layer to a pattern in the first or reference layer in the multilayered structure. The pattern in each layer can be adjusted based upon the pattern in the first layer instead of each layer being based upon the most recent layer. This prevents tolerance stack-up, where errors otherwise multiply with each added layer which can result in significant tolerance stack-up.

Improvements in miniaturizing precision multilayered structures such as microfluidic devices can also be realized with the present system. Because of handling of very small individual components, efficiently creating and precisely laminating these components together becomes very difficult.

The general structure and techniques, and more specific embodiments which can be used to effect different ways of carrying out the more general goals are described herein.

Although only a few embodiments have been disclosed in detail above, other embodiments are possible and the inventors intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, other kinds of material transports, webs, inline sheets, inline components, or combination thereof can be used.

Also, the inventors intend that only those claims which use the words "means for" are intended to be interpreted under 35 USC 112, sixth paragraph. Moreover, no limitations from the specification are intended to be read into any claims, unless those limitations are expressly included in the claims. The computers described herein may be any kind of computer, either general purpose, or some specific purpose computer such as a workstation. The computer may be an Intel e.g., Pentium or Core 2 duo or AMD based computer, running Windows XP or Linux, or may be a Macintosh computer. The computer may also be a handheld computer, such as a PDA, cellphone, or laptop.

The programs may be written in C or Python, or Java, Brew or any other programming language. The programs may be resident on a storage medium, e.g., magnetic or optical, e.g. the computer hard drive, a removable disk or media such as a memory stick or SD media, wired or wireless network based or Bluetooth based Network Attached Storage NAS, or other removable medium. The programs may also be run over a network, for example, with a server or other machine sending signals to the local machine, which allows the local machine to carry out the operations described herein.

Where a specific numerical value is mentioned herein, it should be considered that the value may be increased or decreased by 300%. The inventors believe that this system will be able to form alignments with less than 0.001" standard deviation with suitable components. Where a specified logical sense is used, the opposite logical sense is also intended to be encompassed.

What is claimed is:

1. An apparatus comprising:
    a first transport mechanism for a first material that transports said first material;
    an imaging part for said first material, said imaging part forming images of locations of features in said first material while said first material is being transported by said first transport mechanism;
    a second transport mechanism for a second material that transports said second material;
    a computer that computes locations of said features in said second material, responsive to information from said imaging part including information from said images, and producing outputs indicative of forming features in said second material based on information from said imaging part about said locations of said features in said first material while said second material is being transported by said second transport mechanism, wherein multiple of said features in said first material form a first pattern, and wherein multiple of said features in said second material form a second pattern, where said computer adjusts said second pattern of the second material to match all of a position, size and a rotation of said first pattern while both said first material and said second material are being transported; and
    a feature forming part that forms features in said second material, based on said locations that are computed by said computer, and where said feature forming part forms said features while said second material is being transported.

2. An apparatus as in claim 1, wherein said imaging part uses a camera system to determine locations of patterns.

3. An apparatus as in claim 1 further comprising a laminating part, that laminates together said first and second materials while locations of said first and second materials are set by and held by said first and second transport mechanism.

4. An apparatus as in claim 3, wherein said features in said first material are different from features in said second material but are aligned therewith.

5. An apparatus as in claim 3, wherein said features are microfluidic features.

6. An apparatus as in claim 3, wherein said first and second materials are continuous webs of material.

7. An apparatus as in claim 3, wherein said first and second features automatically mate with one another once laminated together.

8. A method, comprising:
    first transporting a first material;
    detecting positions of first features in said first material during said first transporting, where said features are offset relative to a desired set of features;
    second transporting a second material at the same time as said first transporting;
    using a computer for computing locations of said first features in said first material, and determining locations for second features in said second material during said second transporting, said locations of said second features being aligned with said features in said first material and being offset in the same way as said features in said first material in all of position, size, and rotation on said first material relative to said transporting, said computing carried out while said transporting said second material and said computing being based on said detecting said positions and size and rotation of said first features on said first material to compute locations for said second features that match said position and size and rotation relative to said transporting of said features on said first material;

forming second features in said second material, based on said locations that are computed by said computer, and where said forming said second features is carried out while said second material is being transported; and laminating together said first and second materials with said first features on said first material aligned to said second features on said second material in all of said position, and said rotation relative to said transporting, and said size.

9. A method as in claim 8, wherein said detecting positions comprises using a camera system.

10. A method as in claim 8, wherein said detecting positions comprises using a camera system to determine said features.

11. A method as in claim 10 wherein said computer receives a first image indicative of said locations of said first features.

12. A method as in claim 8, wherein said first and second materials are continuous webs of material, and said transporting comprises transporting said materials using rollers.

13. A method as in claim 8 wherein said computer calculates a second image to match the first image, and uses said second image to calculate said second features.

14. A method as in claim 8 wherein said forming uses a laser/forming tool forms an adjusted image on the second material.

* * * * *